(No Model.)  3 Sheets—Sheet 1.

T. H. ANDREWS.
Brick Machine.

No. 233,909. Patented Nov. 2, 1880.

Witnesses
Fred. G. Dieterich
Jno. P. Brooks

Inventor
Thomas H. Andrews (No Model.) 3 Sheets—Sheet 2.

T. H. ANDREWS.
Brick Machine.

No. 233,909. Patented Nov. 2, 1880.

Witnesses
Fred. G. Dieterich
Jno. P. Brooks

Inventor
Thomas H. Andrews (No Model.)  3 Sheets—Sheet 3.

T. H. ANDREWS.
Brick Machine.

No. 233,909.  Patented Nov. 2, 1880.

Witnesses.
Fred G. Dietrich
Jno. R. Brooks

Inventor
Thomas H. Andrews

UNITED STATES PATENT OFFICE.

THOMAS H. ANDREWS, OF KEOKUK, IOWA, ASSIGNOR OF ONE-HALF TO FRANCIS QUINN.

BRICK-MACHINE.

SPECIFICATION forming part of Letters Patent No. 233,909, dated November 2, 1880.

Application filed September 3, 1880. (No model.)

*To all whom it may concern:*

Be it known that I, THOMAS H. ANDREWS, of Keokuk, in the county of Lee and State of Iowa, have invented certain new and useful Improvements in Brick-Machines; and I do hereby declare that the following is a full, clear, and exact description of the invention, which will enable others skilled in the art to which it appertains to make and use the same, reference being had to the accompanying drawings, which form a part of this specification.

Figure 1:
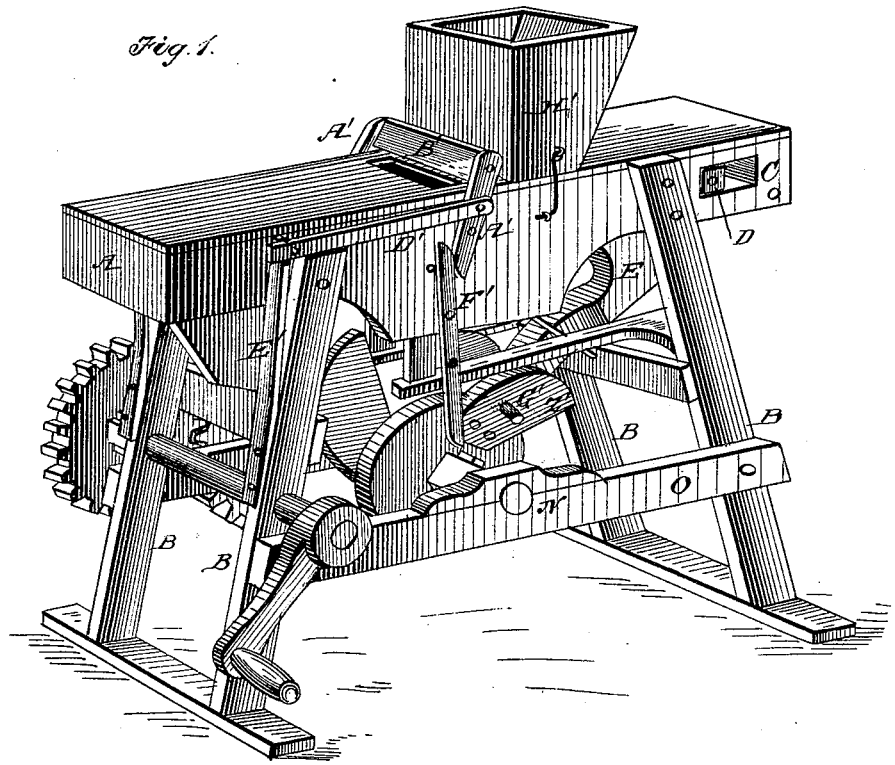
Figure 2:
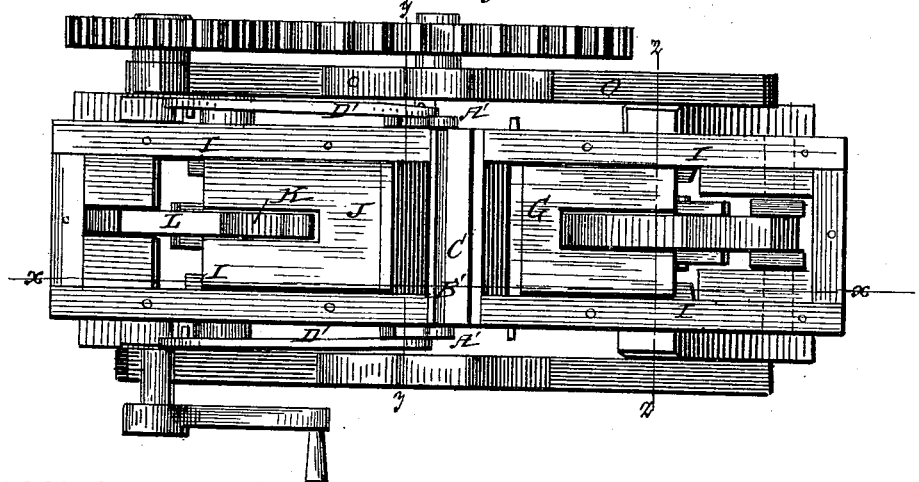
Figure 3:
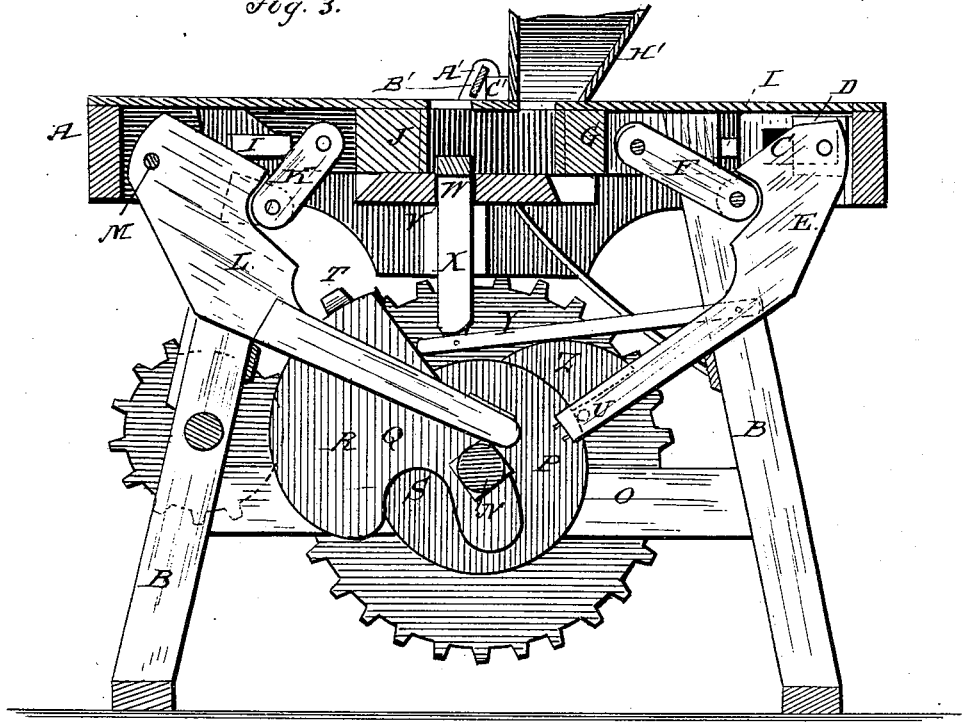
Figure 4:
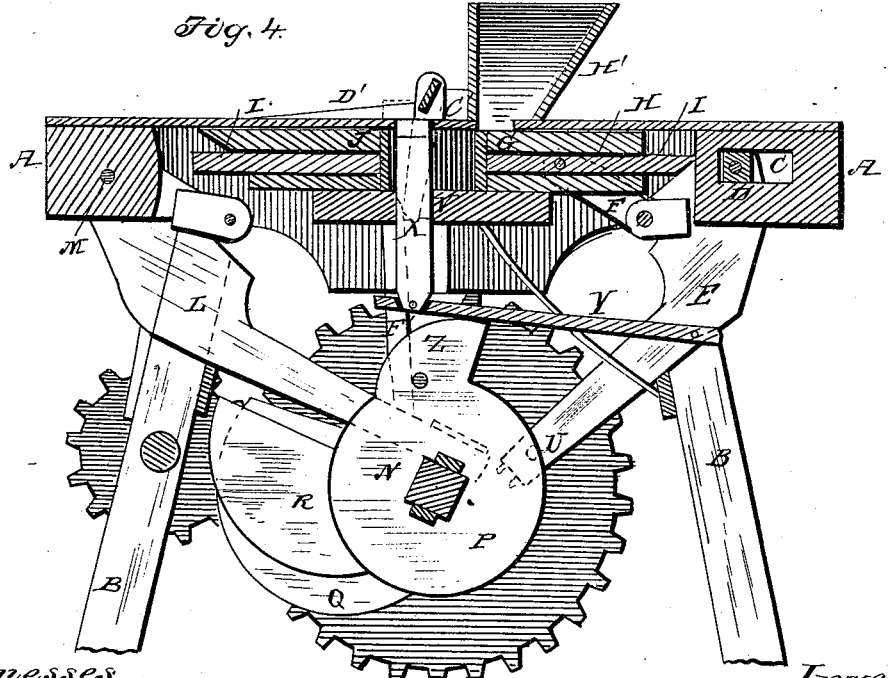
Figure 5:
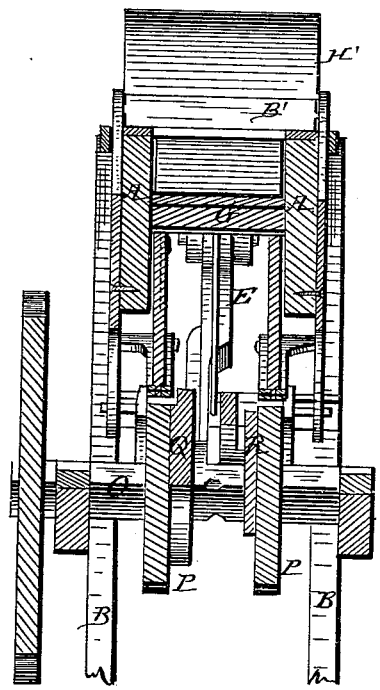
Figure 6:
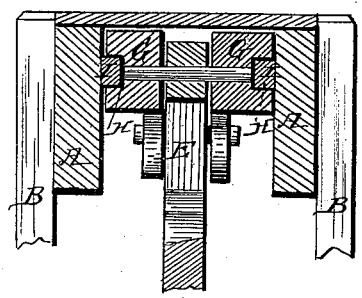
Figure 7:
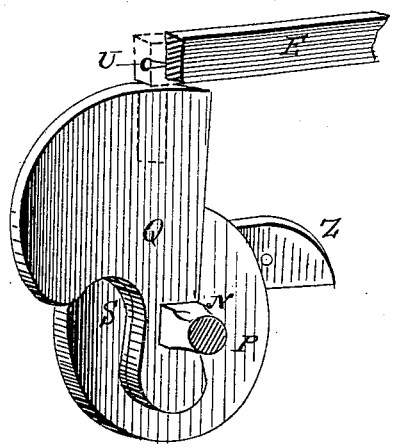
Figure 7:
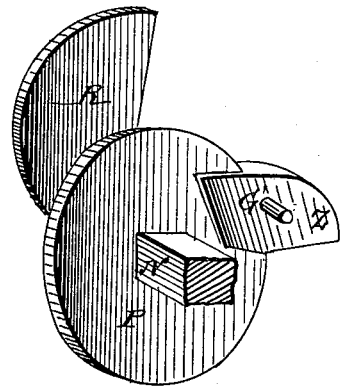

Figure 1 is a perspective view. Fig. 2 is a top view, the hopper and the top or cover having been removed. Fig. 3 is a longitudinal sectional view taken centrally through the machine. Fig. 4 is a longitudinal sectional view on the line $x\,x$, Fig. 2. Fig. 5 is a cross-section on line $y\,y$, Fig. 2. Fig. 6 is a cross-section on line $z\,z$, Fig. 2; and Fig. 7 is a detail view of the cams by which the machine is operated.

Corresponding parts in the several figures are denoted by like letters of reference.

This invention relates to brick-machines; and it consists in certain improvements in the construction of the same, which will be hereinafter fully described, and particularly pointed out in the claims.

In the drawings hereto annexed, A represents the frame or bed of the machine, which is mounted upon suitable legs or supports B B. At the rear end of the machine the sides of the frame are provided with slots C, in which slides a cross-head, D, to which is pivoted a lever, E, projecting downwardly and forwardly, as shown. The lever E is connected, by a pivoted rod, F, with the follower G, sliding longitudinally in the frame, its sides being provided with grooves H, by which it slides upon guide-strips I I upon the inside of the sides of the frame. The front end of the follower G, which constitutes one side of the mold, slides upon the solid bottom of the frame, which forms the bottom of the mold, the top and ends being formed by the top and sides of the frame, respectively. The other side of the mold is formed by the end of a follower, J, constructed like the follower G, and arranged to slide in a similar manner in the front end of the frame.

The follower J is connected, by a pivoted rod, K, with a lever, L, pivoted upon a pin or shaft, M, at the front end of the machine, and projecting in a downward and rearward direction.

Upon a shaft, N, journaled in suitable bearings in braces O O, connecting the front with the rear legs or supports of the machine, are secured the cams by which the levers E L and other working parts of the machine are operated. The cams by which the levers are operated are secured upon the inner sides of two circular disks, P P, and are denoted, respectively, by Q and R. The latter, by which the lever L is operated, is simply a segment secured eccentrically upon the disk. The former, which is also an eccentrically-arranged segment, is provided with a lobe, S, projecting eccentrically upon the opposite side of the shaft, for purposes to be hereinafter described. At its abrupt end the cam Q is provided with a blade, T, adapted to engage a stud, U, upon the side of lever E, near the lower end of the latter. The ends of both levers may be and are preferably weighted, to insure perfect operation.

The bottom of the frame is provided with a slot, V, forming a bearing for a vertically-sliding block, W, having downward-projecting arms X X, hinged or pivoted to rods Y Y, which, in turn, are hinged to the rear legs of the machine, so as to permit a free vertical movement of the block W.

The rods Y Y are supported upon the circular disks P P, which are provided upon their outer sides with cams Z Z, which, at the proper time, gradually raise or elevate the arms and the block W until the latter is on a level with the top of the frame. The cams terminating at this point, the block will, by gravity or by means of suitably-arranged springs, be returned to its original position.

A' A' are levers pivoted to the sides of the frame, and carrying between their upper ends a swiveled cross-piece, B', adapted to slide upon the top of the frame in a forward direction, its rearward movement being checked by a cross-piece or stop, C'. Above their fulcra the levers A' are connected, by pivoted rods D', with springs E', secured upon the front legs of the machine, the tendency of said springs being to force the swiveled cross-piece in a rearward direction toward the stop C'.

To the sides of the frame, below levers A', are pivoted levers F', the upper ends of which are adapted to strike the lower ends of levers A' and force them in a rearward direction, thus carrying the upper ends of said levers, with the swiveled cross-piece, toward the front of the machine.

Levers F' are operated by studs G', secured to the outer sides of the cams Z Z.

Clay is fed to the machine automatically from a hopper, H'. Motion may be imparted to the main shaft N in any suitable manner.

The operation is as follows: As the shaft N rotates the cams Q and R lift the ends of levers E L, which, through the connecting-rods, cause the followers G J to slide toward each other, thus compressing the clay which has been deposited between them from the hopper, from which the follower G serves to cut off further supply. When the ends of the cams are reached the end of lever L drops down, thus causing follower J to return to its original position; but the stud U of lever E is caught by blade T of cam Q, by which the lever and follower are drawn in a forward direction, such movement being permitted by the cross-head D, sliding in the slots C of the frame. By this operation the follower G pushes the brick over upon the vertically-sliding block W. At this moment the end of lever E is released and drops down, when it encounters the lobe S of cam Q, by which it, with the follower and cross-head, is forced back to the rear end of the machine, its original position. At the same time the cams Z Z press against the rods Y Y, thus operating to lift the block W, upon which the brick is supported, up to a level with the top of the frame. The studs G' now strike the lower ends of the levers F', which latter, through levers A', move the swiveled cross-piece B' in a forward direction, thus sliding the brick gradually off the block W over upon the solid top of the bed or frame. As soon as this is accomplished the block W drops down, the ends of the cams having been reached, and the springs E' instantly return the swiveled cross-piece B' to its original position.

From the foregoing description, taken in connection with the drawings hereto annexed, the operation and advantages of my invention will be readily understood. It is simple, durable, easily operated, and capable of producing bricks with great rapidity.

I am aware that a series of plungers have been arranged to work underneath the hopper in a brick-machine in conjunction with a corresponding series of plungers that resist the pressure of the clay, thereby forming bricks, and at the same time travel therewith to the point of delivery, where a vertical slide operates to eject said bricks; but this I do not claim, broadly.

What I claim as my invention, and desire to secure by Letters Patent, is—

1. In a brick-machine, the combination of the frame A, having shaft M and slots C C, the sliding cross-head D, followers G J, levers E L, connecting-rods F K, and suitable operating mechanism, all constructed and arranged substantially as and for the purpose set forth.

2. In a brick-machine, the combination of the frame A, having shaft M and slots C C, the sliding cross-head D, followers G J, pivoted connecting-rods F K, weighted levers E L, the former having stud U, and the shaft N, having cams Q R, the former of which is provided with a blade, T, and lobe S, all constructed and arranged substantially as and for the purpose specified.

3. In a brick-machine, the combination, with the followers G J and their operating mechanism, of the vertically-sliding block W, having downward-projecting arms X X, the hinged rods Y Y, and the cams Z Z, for operating the same, all constructed and arranged as and for the purpose described.

4. In a brick-machine, the combination of the followers G J and their operating mechanism, the vertically-sliding block W, provided with downward-projecting arms X X, the cams Z Z, having studs G' G', the pivoted side levers, F' F' and A' A', the latter having swiveled cross-piece B', the connecting-rods D' D', and the springs E' E', all constructed, arranged, and operating substantially as and for the purpose herein shown and described.

In testimony that I claim the foregoing as my own I have hereto affixed my signature in presence of two witnesses.

THOMAS H. ANDREWS.

Witnesses:
JOHN L. DAY,
A. WEBER,
WILLIAM H. MORRISON.